United States Patent Office 3,144,297
Patented Aug. 11, 1964

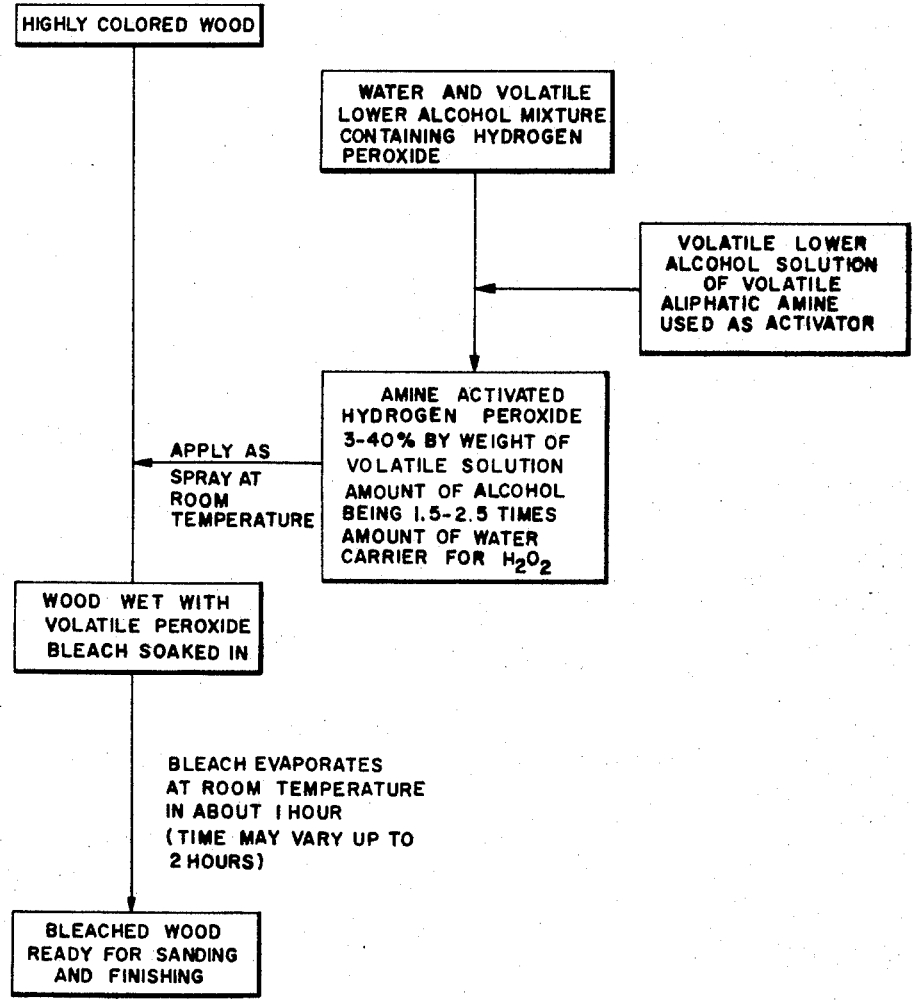

3,144,297
BLEACHING COMPOSITION CONTAINING HYDROGEN PEROXIDE AND METHOD OF BLEACHING COLORED WOOD
Orville L. Kinder, Louisville, Ky., assignor to Reliance Universal Inc., a corporation of Kentucky
Filed July 25, 1961, Ser. No. 126,520
15 Claims. (Cl. 8—111)

This invention relates to novel volatile alcoholic compositions and novel methods useful at ordinary or room temperature for bleaching wood and similar cellulosic material. The compositions and method of the invention are especially suitable in the manufacture of high quality furniture and wood paneling since they are formulated to overcome the well known difficulties of raised grain, insufficient bleach and yellow after residue attending the use of prior known bleaching systems utilizing the same hydrogen peroxide oxidizing agent but employing conventional alkaline reagents in water medium.

The volatile alcoholic bleaching composition of the invention employs a non-toxic monohydric aliphatic alcohol having at least two carbon atoms and no more than four carbon atoms in the alcohol, as in tertiary butyl alcohol exemplifying the upper limit, as the major portion of the volatile medium carrying the alkaline reagent for hydrogen peroxide. As a result of this use of alcohol, penetration of the hydrogen peroxide bleaching agent is controlled at ordinary or room temperature and the evaporation of the aqueous carrier for the hydrogen peroxide reagent at room temperature is augmented due to entrainment with water or the formation of an azeotrope containing a substantial proportion of water, this water originating from the hydrogen peroxide reagent.

A preferred monohydric lower aliphatic alcohol is isopropanol, which is employed as the volatile carrier for the effective bleaching reagents. The effective bleaching reagents consist of a novel volatile organic base and hydrogen peroxide of sufficient oxidizing strength in the aqueous carrier therefor. Isopropanol as the volatile alcohol combines the advantages of high evaporation rate at room temperature, about equal to that of ethanol and high combining capacity for water carrier accompanying the commercial hydrogen peroxide reagent, e.g., binding about 12% of water in the azeotrope as compared with about 5% of ethanol.

Other lower aliphatic monohydric alcohols which are water soluble may be used such as ethanol, which forms an azeotrope with water in 95/5 weight ratio and n-propyl alcohol which is only slightly less volatile than ethanol and like ethanol and isopropanol miscible with water in substantially all proportions. Due to the outstanding water-entraining qualities of isopropanol and its unusually high solvent power for organic pigments and resins as are present in wood coloration it is preferred. Indeed, mixtures consisting of a major proportion of isopropanol and minor proportions of one or both of ethanol and/or n-propanol are generally more effective as the volatile alcoholic vehicle for the aqueous hydrogen peroxide bleaching reagent of the invention than are n-propanol alone or ethanol alone, or mixture of n-propanol with ethanol. Also suitable as the water-soluble alcohol is tertiary butyl alcohol having a boiling point of 82.40 and vapor pressure of 103 mm. of Hg at 40° C. Indeed, with ethanol alone there is a tendency for the bleached surface to develop "blush" which is objectionable and humidity control may be needed to eliminate this "blush."

Methanol is not desirable as the alcoholic vehicle of the bleach of the invention because of its toxicity.

Higher alcohols such as n-butanol, amyl alcohol and isobutanol are unsuitable due to their limited water-solubility, insufficient water-entraining capacity upon evaporation at room temperature and insufficient volatility for effective and reproducible bleaching at room temperature. In contrast, tertiary butyl alcohol is suitable for effective bleaching at room temperature and provides a very light (white) color which minimizes raising of the grain.

A second essential ingredient serving as the alkaline reagent to activate the hydrogen peroxide oxidizing agent to full bleaching power is a volatile lower aliphatic water-soluble, amine having a boiling point at atmospheric pressure of at least about −6 and not more than about 178° C., preferably having a boiling point or boiling range at atmospheric pressure which is less than normal room temperature, e.g., less than 15°–25° C. whereby the activity of the hydrogen peroxide reagent is effectively controlled for a period of about ½ to 2 hours during normal immersion or spray application of the bleaching composition of the invention in this defined normal or room temperature range.

The preferred alkaline volatile lower aliphatic amine is dimethyl amine which has a boiling point of about 7–8° C., is miscible with water in all proportions and supplies an alkalinity in the alcohol mixture which, although less than that supplied by ammonium hydroxide or anhydrous ammonia with the same quantity and strength of aqueous hydrogen peroxide, is yet sufficient to provide a highly effective and completely reproducible bleaching action on colored wood at room temperature avoiding grain raising, yellow discoloration and insufficient penetration, which is characteristic of the use of ammonia or other alkaline reagents used with peroxide bleach.

It is a unique advantage of the alcoholic bleaching composition of the invention that it may be applied to colored wood at room temperature and permitted to dry by normal evaporation at room temperature, the heat evolved during mixing of the alcoholic alkaline solution of volatile amine serving to accelerate bleaching oxidation and evaporation while avoiding the objectionable grain raising which occurs when aqueous alkaline hydrogen peroxide bleaching solutions are employed. Thus, by simply permitting the liquid mixture of volatile alcoholic alkaline amine and volatile alcoholic hydrogen peroxide to dry at normal room temperature while contacting the colored wood surface being bleached, controlled bleaching action occurs in a relatively short time period, e.g., from ½ to 2 hours depending upon the porosity of the colored wood, and no water step is needed to eliminate residual bleach or to stop the bleaching action.

The disadvantages of ammonia-hydrogen peroxide bleaching systems for wood bleaching are well known and well documented. For example, see United States patent to Miller, No. 2,397,193, granted March 26, 1946, who mentions the obnoxious character of the ammonia fumes requiring use of gas masks to protect personnel and note Kritschevsky, United States Patent No. 2,096,400, who finds fault with the insufficient bleaching action occurring only at the surface of the wood and necessitating repeated bleaching treatment to penetrate beyond the surface layer for achieving a furniture grade bleached or transparent finish, in depth, as is needed for highest quality wood products. Kritschevsky's concept for overcoming this inherent defect in the excessively volatile ammonia-hydrogen peroxide bleaching system was directed to the completely opposite end of the volatility scale in the selection of low volatility amines such as ethanol amine, diethanolamine and triethanolamine. The relative order of the volatility of ammonia, the dimethyl amine reagent of the present invention, other volatile lower aliphatic amines and the low volatile ethanol amines of Kritschevsky will be seen from the tabular listing comparing their boiling points below:

| Amine | Boiling point at 760 mm., °C | Remarks |
|---|---|---|
| Ammonia. NH$_3$ | −33.4 | Gas at ordinary temperature e.g., 15-25° C. |
| Monomethyl amine. CH$_3$NH$_2$ | −6 | Too volatile for preferred amine alkaline reagent of present invention, irritating to personnel, insufficient bleaching action, insufficient penetration. |
| Dimethyl amine (anhydrous). (CH$_3$)$_2$NH | 7.2–7.3 | Preferred amine, with isopropanol and H$_2$O$_2$ provides bleach which takes 1-2 hours to evaporate at room temperature, effective to penetrate below surface and not as irritating to personnel. |
| Trimethylamine (anhydrous). (CH$_3$)$_3$N | 3.5 | Noxious odor due to volatility. |
| Monoethylamine (anhydrous). C$_2$H$_5$.NH$_2$ | 15–18 | Effective bleach but not as isopropyl alcohol, hydrogen peroxide and dimethylamine; takes slightly longer to evaporate at room temperature; may be used to replace part or all of the dimethylamine but latter is better. |
| n-Propylamine (anhydrous). C$_3$H$_7$.NH$_2$ | 49–50 | Effective bleach with isopropyl alcohol and may be used to replace all or part of dimethylamine. |
| Triethylamine (anhydrous). (C$_2$H$_5$)$_3$-N | 89.5 | Volatility somewhat low and not as good as dimethylamine. |
| Di-n-propyl amine. (C$_3$H$_7$)$_2$-NH | 110–111 | Volatility low; solubility in water low. |
| Isopropylamine. C$_3$H$_7$.NH$_2$ | 31.9 | Satisfactory bleach; may be used to replace all or part of dimethyl amine but latter is better. |
| Di-isopropylamine. (C$_3$H$_7$)$_2$-NH | 81–85 | Unsatisfactory volatility. |
| Monoethanolamine. NH$_2$.C$_2$H$_4$OH | 172.2 | Non-volatile (vapor pressures are at 20° C.=0.67 mm. Hg); requires water wash to remove because does not evaporate at room temperature. |
| Diethonolamine. NH(C$_2$H$_4$OH)$_2$ | 268 | Vapor pressure less than 0.01 mm. Hg at 20° C.; requires water wash to remove because does not evaporate at room temperature. |
| Triethanolamine. N(C$_2$H$_4$OH)$_3$ | 360 | Vapor pressure less than 0.01 mm. Hg at 20° C.; requires water wash to remove because does not evaporate at room temperature. |

From the above table it will be seen that only a few amines which are volatile are suitable for evaporative bleaching at room temperature in accordance with the invention and thereby require no after washing treatment. Examples of these suitable amines are dimethylamine, n-propylamine, isopropylamine and monoethylamine. Organic bases such as trimethylamine are too volatile and unsatisfactory for the same reason that ammonia is unsatisfactory. Di-n-propylamine and di-isopropylamine are unsatisfactory due to the disadvantageous non-volatility which requires an additional removal step as by washing. In this respect the non-volatile amines are like the amines of Kritschevsky.

Each of the useful volatile lower aliphatic amines used in the volatile alcoholic vehicle of the present bleaching composition have at the normal room temperature of application to colored wood a vapor pressure which is close to or above 760 mm. of Hg; in the case of dimethylamine and monomethylamine the vapor pressure is above 760 mm. of Hg at 20° C. Since the heat of reaction of hydrogen peroxide amine and the wood brings the temperature of the alcoholic mixture to about 40–60° C., these vapor pressures at the increased temperature develop in excess of this value. In the case of n-propylamine and isopropylamine at the temperature resulting after exothermic heat is evolved by bleaching oxidation, e.g., at temperatures of 40–60° C., the vapor pressure is also close to 760 mm. of Hg.

In contrast to this value of vapor pressure of the amine in the invention, the vapor pressure of the ethanol amines used by Kritschevsky in his United States Patent No. 2,096,400 are from about 1/1000 to 1/10,000 of the value of vapor pressure of the amines of the invention.

In the absence of the volatile amine activator the peroxide is not sufficiently effective to remove the natural wood colorant in the usual darkly colored woods such as cherry wood, mahogany, walnut and pecan wood and the like. In the absence of the volatile alcohol, e.g., in a water system containing amine, the solution takes from about 8 hours to overnight to evaporate at room temperature. An alkaline residue is left in the wood itself. The color is not white but off-yellow depending on the amount and strength of the alkali. The grain of the wood is raised due to the swelling effect of the aqueous oxidizing solution within the cell structure of the grained wood.

It is, therefore, surprising in view of the teaching of Kritschevsky of low-volatility or non-volatile types of amines that the present volatile amines can be effective. The ethanol amines of Kritschevsky have vapor pressures of less than 1 mm. Hg at 20° C. and, indeed, less than 0.01 mm. Hg at room temperature. Under Kritschevsky's concept it was thought that only the more highly substituted alkylol amines would overcome the shortcomings of the volatile ammonia process. That there could be achieved a room temperature bleaching operation which can, over a period up to several hours, effectively penetrate and bleach highly colored woods at room temperature to provide outstanding bleaching results, would not be expected in view of the known deficiencies of the more volatile ammonia system.

Speed in production and uniformity of high quality bleaching action result from the improved room temperature bleaching action in accordance with the invention. If force drying at elevated temperatures, e.g., up to about 140° F. is resorted to, even greater production speed may be achieved. The elevated temperatures seem effective in driving off any lingering moisture to facilitate the applications of subsequent finishing materials. Washing operations are dispensed with and the bleached wood is ready for finishing without any additional treatment.

For easy practical application by brushing, spraying or immersion, the bleaching composition of the invention comprises a two-package system formulated as two solutions, the first solution containing the active aqueous hydrogen peroxide oxidizing agent and the volatile alcohol which forms an azeotropic mixture with water and the second solution contains the volatile lower aliphatic amine which is soluble in water and is volatile at room temperature to leave no residue after bleaching. This volatile amine supplies the alkaline environment in the presence of the volatile alcohol and limited amount of water serving as the carrier for hydrogen peroxide to permit a relatively slow (1–2 hours) and controlled bleaching action at room temperature which is at the same time completely and reproducible effective at room temperature. In the mixture which results from the blending of the two packages on wood being bleached there is present a major proportion of alcohol and a minor proportion of water. This minor proportion of water is entrained by the volatile alcohol during evaporation.

The amine solution may be applied first followed immediately by the peroxide solution or the peroxide may be applied first followed by the amine solution. Both solutions may be sprayed through a 2-nozzle gun and applied simultaneously.

Thus, in contrast to the non-volatile ethanolamine used in the Kritschevsky patent, the major volatile component of the present novel composition is not water but a volatile alcohol which, by itself when spread as a film over wood will substantially completely evaporate without residue at room temperature in less than about 45–60 minutes and which in the presence of sufficient aqueous hydrogen peroxide bleach of appropriate strength for wood bleaching will accelerate the evaporation of said aqueous bleach so that no residue or objectional yellow discoloration remains after about 1½ to 2 hours.

It will be noted that the volatile alcohol such as isopropanol is present in an amount of about 1.5 to 2.5 times that of the water and as carrier for the hydrogen peroxide reagent thereby providing effective entrainment of water during evaporation at room temperature.

A striking procedural difference in the novel use of the present bleaching composition as compared with the Kritschevsky patent is the fact that in a preferred procedure of the invention initial liquid treatment of the colored wood is made with the hydrogen peroxide reagent rather than the volatile alcoholic amine reagent. Although the order of addition may be reversed or the reagent applied separately, the first effective subsurface penetration by the preferred procedure is effected by the alcoholic aqueous hydrogen peroxide having a sufficiently effective concentration expressed as anhydrous hydrogen peroxide to provide at least 3% and up to about 40% of hydrogen peroxide in the combined solutions, by weight this amount employed depending upon the extent and nature of pigmentation in the wood or cellulosic product, the porosity of the wood or cellulosic product and the subsurface depth of bleach desired. Usually about 20–25% $H_2O_2$ is sufficient but occasionally 40–45% $H_2O_2$ may be needed for heavy duty bleaching operation. Bleaching penetration readily occurs to beyond a depth of 1/64 inch with practically no impairment of the surface treatment.

Although the mechanism of bleaching action of the present composition has been explained above in terms of the distinctive and unique advantages flowing from use of the latently active aqueous hydrogen peroxide reagent in volatile alcoholic medium which is activated to a powerful oxidizing stage by addition of a mixture of both volatile amine and alcohol components to simultaneously activate and evaporate the active ingredients by the volatile alcohol components and without the need for application of external heat, it will be appreciated that the complex chemical reactions, altering colored products by oxidation to colorless products are not completely understood. Although it is believed that penetration is due in great part to the controlled water content which results from the addition of volatile alcohol to the first liquid treating reagent, e.g., the solution of aqueous hydrogen peroxide in volatile alcohol such as ispropanol. Grain raising during bleaching is eliminated due to this alcohol addition to the first solution and appears also to be minimized due to the selection of the volatile amine which exerts a significant solvent and penetrating action to augment liquid peroxide penetration for substantial distances below the surface of the colored wood.

With highly colored wood such as cherry wood and mahogany, the concentration of hydrogen peroxide based upon all of the reagents added is preferably from 15 to 35%, and in this concentration the amount of water is generally about twice the amount of hydrogen peroxide, the latter expressed as anhydrous peroxide. At maximum hydrogen peroxide concentration of about 40–45% by weight of the total mixture the amount of volatile alcohol in the first treating solution is at least about 15% by weight thereof, and at minimum hydrogen peroxide concentration the volatile alcohol is up to about 65% by weight. In preferred mixtures this corresponds to a water content in the first treating solution of about 30% to about 78% by weight of this first solution. In the second anhydrous treating solution containing only volatile alcohol and amine, an amount of liquid equal to the first solution is added which cuts the total water content of the bleaching system by one-half, e.g., from about 15% to about 39% in contrast with 100% water vehicle used in the conventional aqueous system.

On the above basis it is believed that the favorable solvent penetrating action of volatile alcohol and volatile amine can be better appreciated. The alcoholic environment would ordinarily be thought to be too excessively volatile to achieve sufficient penetration. It will be appreciated that bleaching at elevated temperature under pressure may be carried out if desired, but it is not necessary for the general practice of the invention.

The following are specific examples illustrating certain preferred embodiments of the invention, but not limiting the invention to these embodiments, and instead to be read in accordance with the foregoing description.

EXAMPLE I

This example illustrates the bleaching at room temperature 22° C. of cherry veneer 1/16 inch in thickness and illustrates sequential spray application of the oxidizer and activator solutions of the invention to achieve completely effective bleaching after treatment and evaporation of these solutions at room temperature during a period of about 55 minutes.

The oxidizer solution containing the active hydrogen peroxide reagent is mixed as follows and is identified as Bleach A.

*Bleach A*

|  | Percent by weight |
|---|---|
| Hydrogen peroxide (50% concentration) | 40 |
| Distilled water | 30 |
| Isopropyl alcohol | 30 |
|  | 100 |

The volatile amine activator solution is identified as Bleach B and is mixed as follows:

*Bleach B*

|  | Percent |
|---|---|
| Dimethylamine, anhydrous | 20 |
| Isopropyl alcohol | 80 |
|  | 100 |

First a full wet coat of Bleach A is sprayed onto the cherry wood. Within a few minutes after this application, a coat of Bleach B is sprayed. After the application of Bleaches A and B, the wood is permitted to dry and this is accomplished within about 1 hour. No subsequent bleaching step is required with sample. The wood is prepared for finishing in the usual manner after drying is completed.

During the spraying operation, a steel booth fitted with a water reservoir pan was used so that when the bleach was sprayed on the wood and during the spraying operation a continual flow of water was kept in the reservoir pan to prevent the accumulation of any harmful concentration of bleach overspray.

The walls of the booth were hosed every two hours for the same reason. By carrying out bleaching in an independent spray booth, the fire hazard caused by the accumulation of bleach in contact with organic materials is minimized.

A polyethylene or Teflon lined hose was used for spraying the solution and the spray guns were made of stainless steel to eliminate corrosion.

Force drying at temperatures up to 140° F. for 10 minutes to ½ hour is not necessary for small scale operations nor is it needed for the usual production schedules. High rates of production can, however, be achieved by force drying.

EXAMPLE II

In this example there is illustrated the bleaching of dark mahogany wood strips 1 inch in thickness. The oxidizer composition Bleach A was applied by spray to completely cover the surface of the wood with an excess of the liquid. After this first spray had soaked in and with liquid film still showing on the surface, Bleach B was sprayed over Bleach A in accordance with the procedure of Example I. The spraying operation was carried out in the steel booth as described in Example I. The wood was permitted to dry and bleaching to a substantial distance below the surface occurred during the drying step which took about 1 hour for the liquid to evaporate. After 1 additional hour of drying, the wood was prepared for finishing in the usual manner.

EXAMPLE III

In this example, there is illustrated bleaching of dark mahogany by immersion. A strip of dark mahogany veneer 1/16 inch thick was immersed in a mixture of Bleach A and Bleach B as set forth in Example I and allowed to stand submerged in the mixture for about 5 minutes. The strip of veneer was removed, allowed to dry for 2 hours and then finished in the usual manner. Effective bleaching of both opposite surfaces of the veneer was achieved to provide white highly bleached surfaces with no raising of the grain.

The drawing represents a flow diagram of applicant's bleaching method and the bleaching composition employed therein.

Having thus disclosed the invention, what is claimed is:

1. A volatile liquid bleaching composition, for application to colored wood at room temperature which is effective to decolorize said wood during evaporation of said liquid at room temperature, containing a major proportion of a non-toxic volatile lower aliphatic monohydric alkanol having at least two and no more than four carbon atoms, said alkanol being a solvent for aqueous hydrogen peroxide, aqueous hydrogen peroxide dissolved in said alkanol and a volatile lower aliphatic water-soluble amine selected from the group consisting of dimethylamine, triethylamine, monethylamine, n-propylamine, isopropylamine and mixtures of these amines with each other said volatile amine serving to provide an alkaline medium for said hydrogen peroxide, the concentration of hydrogen peroxide varying from about 3% to about 40% by weight of the total ingredients of the solution and said alkanol being present in an amount of about 1.5 to 2.5 times the amount of water present as carrier for the aqueous hydrogen peroxide.

2. A composition as defined in claim 1 wherein said alcohol is a mixture of isopropyl alcohol and ethanol.

3. A composition as claimed in claim 1 wherein said alcohol is a mixture of isopropyl and n-propyl alcohol.

4. A composition as claimed in claim 1 wherein said volatile amine is n-propyl amine.

5. A composition as claimed in claim 1 wherein said volatile amine is isopropyl amine.

6. A composition as claimed in claim 1 wherein said volatile amine is monoethylamine.

7. A composition as claimed in claim 1 wherein said volatile amine is a mixture of dimethylamine and monoethylamine.

8. A volatile liquid bleaching composition for application to colored wood at room temperature, which is effective to decolorize said wood during evaporation of said liquid at room temperature containing a major proportion of isopropyl alcohol, aqueous hydrogen peroxide and dimethylamine as a volatile alkaline agent for said hydrogen peroxide, the concentration of hydrogen peroxide expressed as pure hydrogen peroxide varying from about 3% to about 40% by weight of the total ingredients of the solution and said alcohol being present in an amount of about 1.5 to 2.5 times the amount of water present as carrier for the aqueous hydrogen peroxide.

9. A composition as defined in claim 8 wherein hydrogen peroxide expressed as anhydrous hydrogen peroxide is present in a concentration of 15% to 25% by weight.

10. A method of bleaching colored wood and like cellulosic products comprising treating said wood at room temperature in a single bleaching step with a solution of aqueous hydrogen peroxide in a volatile lower aliphatic alkanol having at least two and no more than four carbon atoms in the alkanol, said alkanol being the main component of the mixture, there being present a volatile water soluble amine dissolved in said alkanol selected from the group consisting of dimethylamine, triethylamine, mono-ethylamine, n-propylamine, isopropylamine and mixtures of these amines with each other, said volatile amine serving to provide an alkaline medium for said hydrogen peroxide, the concentration of hydrogen peroxide, varying from about 3% to about 40% by weight of the total ingredients of the solution and said alkanol being present in an amount of about 1.5 to 2.5 times the amount of water present as carrier for the aqueous hydrogen peroxide and permitting the so-treated wood to dry at room temperature whereby said wood is bleached and is ready for subsequent finishing operations in the absence of any washing.

11. A method as defined in claim 10 wherein said alcohol is a mixture of isopropyl alcohol and ethanol.

12. A method as claimed in claim 10 wherein said alcohol is a mixture of isopropyl and n-propyl alcohol.

13. A method as claimed in claim 10 wherein said volatile amine is n-propyl amine.

14. A method as claimed in claim 10 wherein said volatile amine is a mixture of dimethylamine and monoethylamine.

15. A method as claimed in claim 10, wherein said volatile amine is monoethylamine.

References Cited in the file of this patent

UNITED STATES PATENTS

| | | |
|---|---|---|
| 1,966,915 | Baier | July 17, 1934 |
| 2,096,400 | Kritchevsky | Oct. 19, 1937 |
| 2,166,954 | Kauffmann et al. | July 25, 1939 |
| 2,203,589 | Baymiller | June 4, 1940 |
| 2,903,327 | Rogers | Sept. 8, 1959 |